June 12, 1923.

H. C. SHAMBLIN

LUBRICATING DEVICE

Filed July 6, 1921

WITNESSES

INVENTOR
HARVEY C. SHAMBLIN.
BY
ATTORNEYS

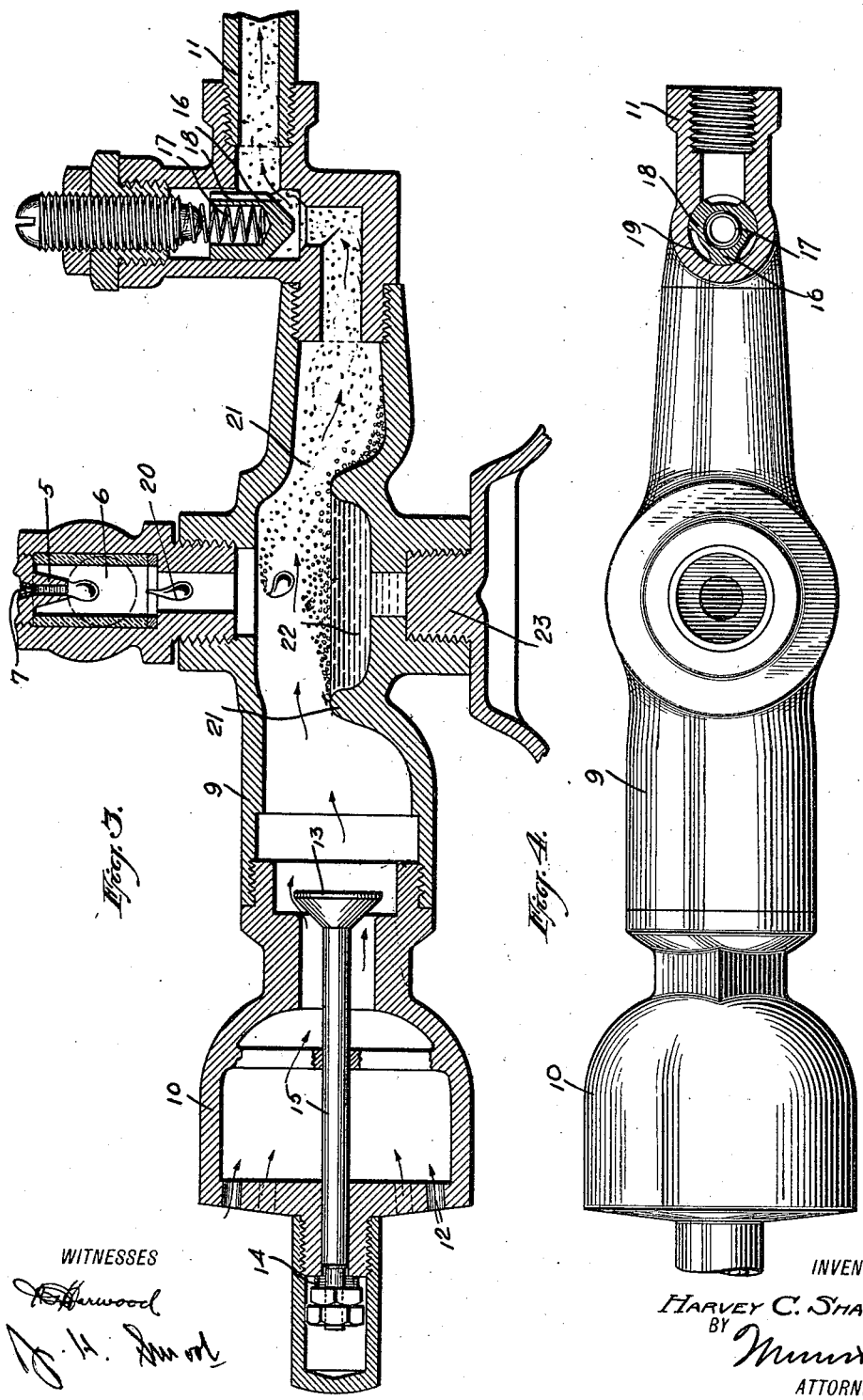

Patented June 12, 1923.

1,458,895

UNITED STATES PATENT OFFICE.

HARVEY C. SHAMBLIN, OF MIAMI, OKLAHOMA.

LUBRICATING DEVICE.

Application filed July 6, 1921. Serial No. 482,735.

*To all whom it may concern:*

Be it known that I, HARVEY C. SHAMBLIN, a citizen of the United States, and resident of Miami, in the county of Ottawa and State of Oklahoma, have invented a new and Improved Lubricating Device, of which the following is a full, clear, and exact description.

My invention relates to a lubricating method and device which is primarily adapted for use in connection with internal combustion engines, but is not necessarily limited to this particular association.

It is a well appreciated fact that considerable difficulty has been experienced in systems employing a vehicle for the lubricant. This is to be attributed to the fact that the lubricant is not as a whole evenly distributed, that is, the same introduced into the consuming element to the best advantage.

More particularly in connection with this latter objection it is to be noted that as a general rule the lubricant appears in relatively large particles so that even although a sufficient quantity is utilized, it will be found that an excess of oil will appear in certain parts of the consuming element, while insufficient lubricant will be found at other portions thereof.

With these and further objects in mind my present invention aims to provide a lubricating system and device by means of which an operator may adjust the supply in such a manner that just the correct amount of lubricant will be utilized in that the lubricating substance will be sub-divided into minute particles and evenly distributed so that all of the objections in this connection will be avoided.

A further object of my invention is the provision of a device and method of the character specified which shall be capable of manufacture and application at a nominal figure.

Still further objects of my invention will appear in the annexed specification, taken in connection with the drawings, which latter illustrate one practical embodiment of the same, and in which;

Figure 3 is a sectional side view and showing the device in operation, and

Figure 4 is a partly sectional plan view of the same.

The essence of my invention consists in intersecting a flow of lubricant by a moving column of fluid, acting as a vehicle. Thus when the fluid column is moving at a relatively high rate of speed it will be understood that the drops of lubricant upon moving into the path of the same will be shattered into minute particles. By this an even permeation of the lubricant throughout the column of fluid will be insured.

Furthermore, my invention contemplates the use of the surface evaporation principle to insure the result desired, thus doubly insuring the result desired.

Figure 1:
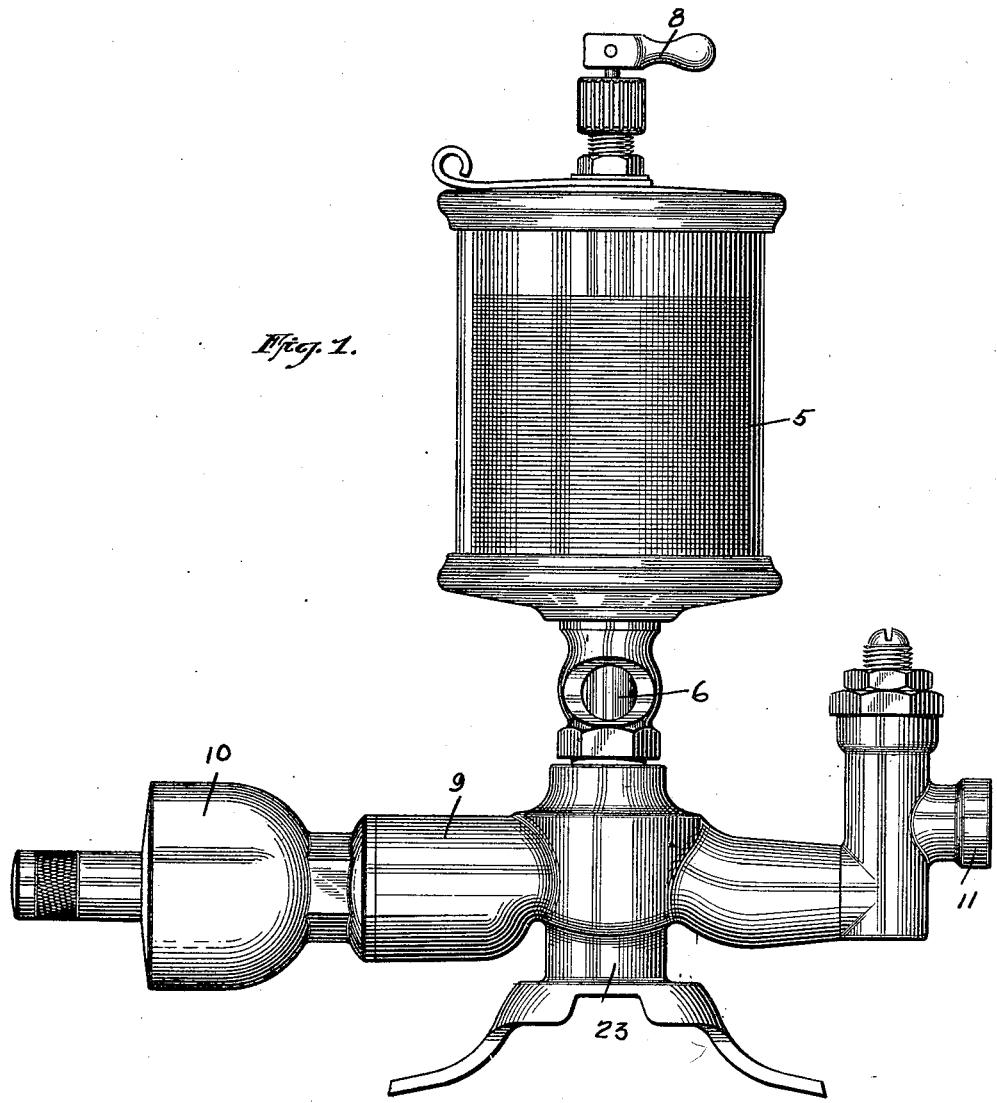
Figure 1 is a side view of the lubricator.

Attention is invited to Figures 1 and 4 in which the lubricator employed is shown. It will be seen in this view that the reference numeral 5 indicates an oil reservoir of any desirable type, the outlet end of which may be provided with a conventional sight opening 6 through which the flow of the fluid may be observed, it being noted in this connection that a valve 7 operated by any suitable control 8 may regulate this flow.

In the embodiment illustrated, the discharge end of the reservoir 5 is connected to a conduit 9, a cap 10 being secured to the intake end of the latter, the discharge end of said conduit conveniently terminating in a connecting socket 11 by means of which the same may be attached to the consuming element.

Figure 2:
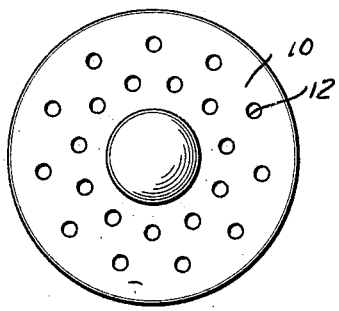
Figure 2 is an end view thereof.

Further it will be noted reference being had to Figures 2 and 3, that the cap 10 is formed with a perforate head 12 so that air may be introduced into the device at this point, it being noted that the flow is normally controlled by means of a valve 13 co-operating with a seat within the conduit 9, and having a spring 14 associated with this stem 15 which spring tends to normally seat the valve 13.

Furthermore a secondary valve 16 is associated with the conduit 9 adjacent its outlet end, and a spring 17 also co-operates with this valve to retain the same seated, it being noted in this connection that the body of the valve is preferably formed with lips 18 so that spaces 19 are provided normally permitting of a restricted flow of fluid at these points, it being of course appreciated that any desirable character of valve may be utilized at both the intake and outlet ends of the conduit.

Now with a view of providing means which will serve to cause the fluid passing through the conduit 9 to act as a vehicle for the lubricant flowing from the reservoir 5 it will be noted that the outlet end of the latter terminates at a point adjacent the bore of the conduit so that drops 20 of the lubricant will fall into this bore, and thus intersect the path of flow of any fluid passing through the same. In this connection it is also to be noted that the conduit 9 is preferably formed with inwardly extending portions 21 at points in advance and to the rear of the point of connection of the reservoir 5 therewith. By this construction the bore of the conduit is restricted at these points, and it will be obvious that the flow of fluid through the same will thus be accelerated for a purpose hereinafter brought out.

With a view of reducing the cost of manufacture it will be noted that the inwardly extending portions 21 may, in addition to the purpose specified in the preceding paragraph, also form the side walls of a basin 22 directly underlying the adjacent end of the reservoir 5, it being noted that a drain plug 23 may be associated with the base of the receptacle thus formed so that the latter may be drained.

Assuming now that a device embodying the construction aforedescribed, has its outlet end associated with a consuming element, such as an internal combustion engine, it will be appreciated that a suction exerted by this element upon the bore of the conduit 9 will primarily result in sufficient inches of vacuum operating on the valve 13 to unseat the latter against the tension of the spring 14. When this occurs, air or any other fluid utilized, as a vehicle, will flow through the conduit 9 and through the spaces 19 provided by the valve 16, and as the suction increases the latter will be unseated to permit of a more non-restricted flow of the fluid. The valve 7 of the reservoir 5 may be adjusted to permit of just the proper quantity of lubricant flowing or dripping from the discharge end of the reservoir into the bore of the conduit, and it will be obvious that this fluid will take a course directly intersecting the path of flow of the fluid passing through the bore of the conduit.

Due to the rapid rate of flow of the latter fluid, particularly where the bore of the conduit is restricted at this point resulting in a "venturi like" action, the lubricant will be shattered into fine particles and be evenly distributed in the fluid within the bore of the conduit 9 thus providing a homogeneous mixture which when introduced into a consuming element will obviously produce most efficient results.

In addition to the action specified it will be understood that a certain amount of the lubricant, and particularly the heavier particles thereof will not be completely absorbed by the fluid within the conduit 9, incident to the paths of the two fluids intersecting each other. Thus these particles will be received by the basin 22, and for this reason it will be obvious that surface evaporation of the contents of the basin 22 will be effected in that the flow of the fluid acting as vehicle will be directly upon the surface of the fluid retained within the basin 22, and thus the quality of fluid entering the consuming element will be even throughout.

From the foregoing it will be understood that all of the objects set forth in the preamble of this specification have been accomplished and it will further be appreciated that numerous modifications of structure might readily be resorted to without in the least departing from the scope of my claims; which are:

1. A lubricating device including a conduit, a valved air inlet in one end of the conduit, a valved outlet in the other end of the same, both of said valves being adapted to be opened by suction exerted at the outlet end of the conduit, and means for dropping lubricant across the air passage of the conduit.

2. A lubricating device including a conduit, a valved air inlet in one end of the conduit, a valved outlet in the other end of the same, both of said valves being adapted to be opened by suction exerted at the outlet end of the conduit, a basin positioned within said conduit, and means for dropping lubricant across the air passage of said conduit into said basin.

3. A lubricating device including a conduit, a reservoir formed with an outlet end connected to said conduit, said reservoir being adapted to receive a lubricating fluid which will drop across said conduit, said conduit being adapted to have a current of air passing through its length whereby the flow of lubricant into said conduit will be intersected by the flow of air thereby surcharging the latter with lubricant, and means within said conduit and adjacent the point of connection of the reservoir therewith for increasing the velocity of the flow of air through said conduit and at a point underlying the outlet end of said reservoir.

HARVEY C. SHAMBLIN.